United States Patent [19]

Kim

[11] Patent Number: 5,583,721
[45] Date of Patent: Dec. 10, 1996

[54] CONNECTING DEVICE OF A FLEXIBLE PRINTED CIRCUIT IN A HARD DISK DRIVE

[75] Inventor: Jeong-Ha Kim, Suwon, Rep. of Korea

[73] Assignee: SamSung Electronics Co., Ltd., Suwon, Rep. of Korea

[21] Appl. No.: 423,740

[22] Filed: Apr. 18, 1995

[30] Foreign Application Priority Data

Apr. 23, 1994 [KR] Rep. of Korea ............... 8626/1994
Nov. 19, 1994 [KR] Rep. of Korea ............... 30495/1994

[51] Int. Cl.⁶ .................................................. G11B 5/012
[52] U.S. Cl. ........................................ 360/97.01; 360/137
[58] Field of Search ........................... 360/97.01, 137

[56] References Cited

U.S. PATENT DOCUMENTS

| | | | |
|---|---|---|---|
| 4,127,274 | 11/1978 | Griffith | 369/226 |
| 4,202,550 | 5/1980 | Morinaga | 369/86 |
| 4,881,140 | 11/1989 | Ghose et al. | 360/106 |
| 4,965,684 | 10/1990 | Stefansky | 360/78.12 |
| 5,025,335 | 6/1991 | Stefansky | 360/97.01 |
| 5,027,239 | 6/1991 | Hagen | 360/104 |
| 5,060,100 | 10/1991 | Mihara et al. | 360/106 |
| 5,103,359 | 4/1992 | Marazzo | 360/104 |
| 5,241,436 | 8/1993 | Kawabata et al. | 360/97.01 |
| 5,243,495 | 9/1993 | Read et al. | 360/97.01 |
| 5,337,202 | 8/1994 | Jabbarai et al. | 360/97.01 |

*Primary Examiner*—John H. Wolff
*Attorney, Agent, or Firm*—Robert E. Bushnell, Esq.

[57] ABSTRACT

The present invention relates to a connecting device of a flexible printed circuit (FPC) in a hard disk drive and more particularly to a connecting device of a flexible printed circuit, which is connected between a head installed at an actuator of the hard disk drive and a printed circuit substrate and removes a bias force generated in the flexible printed circuit, thus transmitting a signal between the head and the flexible printed circuit. The connecting device of the flexible printed circuit for transmitting the signal between the printed circuit substrate installed at a body base and a preamplifier which is connected to a signal cable of the magnetic head at the actuator in the hard disk drive, includes a boss having a hole passing through a center portion and a side hole; a pivot bearing fixed at the boss in order to enable the actuator to be rotated; and a pivot screw for forming a wire hole, and being inserted into a female screw formed within the boss, and then for being fixedly installed at the pivot bearing, thereby being coupled to a connecting wire through the side hole, the hole and the wire hole of the pivot screw.

16 Claims, 5 Drawing Sheets

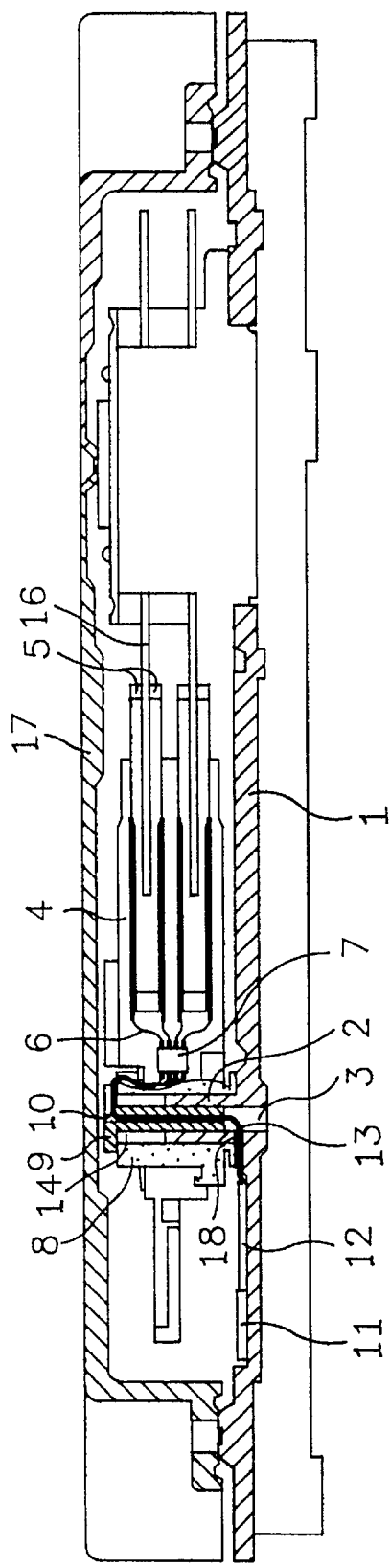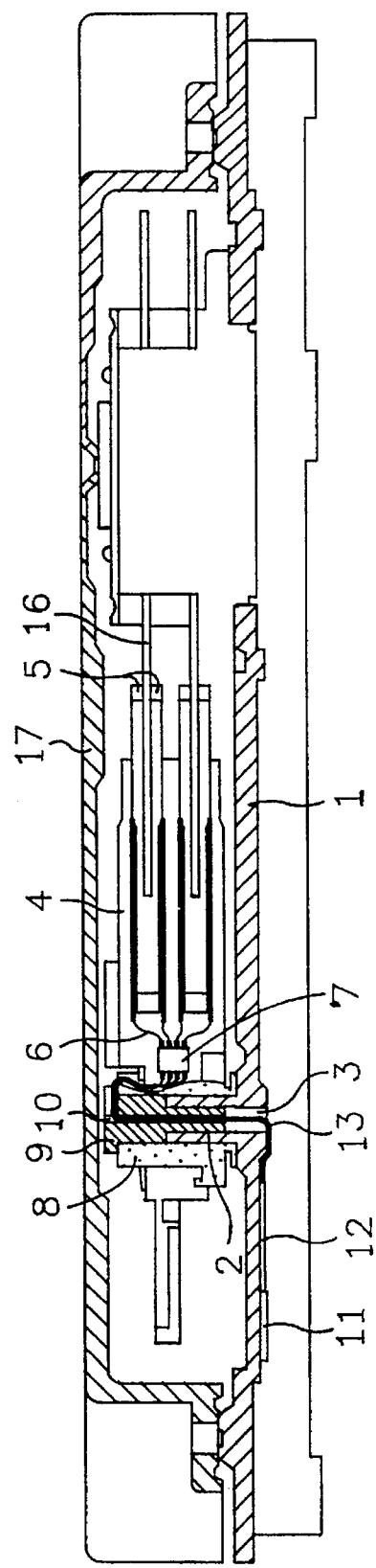

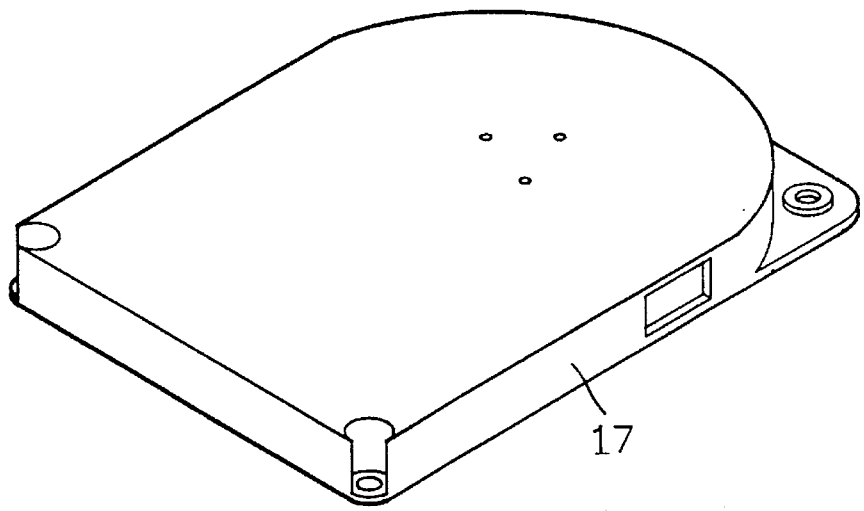
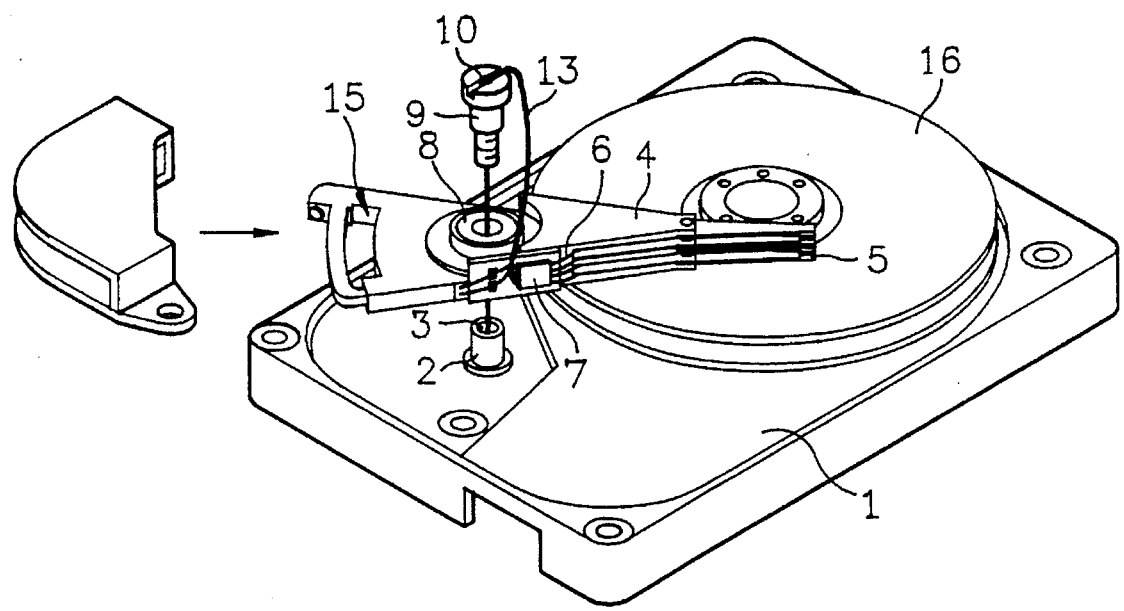
FIG. 4

CONNECTING DEVICE OF A FLEXIBLE PRINTED CIRCUIT IN A HARD DISK DRIVE

CROSS-REFERENCE TO RELATED APPLICATIONS

This application makes reference to, incorporates herein and claims all benefits accruing from our applications entitled A Connecting Device Of A Flexible Circuit In A Hard Disk Drive earlier filed in the Korean Industrial Property Office on 23 Apr. 1994 an duly assigned U.S. Ser. No. 8626/1994, and filed on 19 Nov. 1994 and duly assigned U.S. Ser. No. 30495/1994.

BACKGROUND OF THE INVENTION

The present invention relates to a connecting device in a hard disk drive (hereinafter, referred to as HDD), and more particularly to a connecting device that electrically connects a head installed on an actuator of the hard disk drive to a printed circuit substrate to enable transmission of signals between the head and the printed circuit substrate to minimize the transfer of force between the freely rotating actuator and the connecting device.

Generally, the hard disk drive used as either a main memory or, less frequently, an auxiliary memory device in a computer, includes a disk rotated at a high speed by a spindle motor, and an actuator having a magnetic head that reads and writes data recorded on tracks of the disk.

The actuator is mounted upon a bearing that is rotatable about a pivot positioned at a center portion of the actuator. As a bobbin and a coil are positioned at one end of the actuator to move under the control of a voice coil motor, the magnetic head is positioned at the other end of the actuator to move at both ends of the disk, thereby reading and writing data on tracks of the disk. Then, the magnetic head being moved at both surfaces of the disk, which is installed at a leading end of head gimbals, moves while maintaining a minute air gap between the head and the surface of the disk created by an upward force produced between the surface of the disk and the magnetic head as the disk rotates at a high speed.

When the hard disk drive stops or power to the spindle motor is turned off, the actuator is mounted to move to a parking zone located at an inner portion of the disk. When the power to the spindle motor of the hard disk drive is turned off, the actuator is adjusted to move inwardly, to thereby, in advance, prevent data recorded on the disk from being damaged due to contact between the magnetic head and the surface of the disk.

In the conventional hard disk drive operated as described above, a preamplifier is installed on one side of the actuator and a flexible printed circuit cable (e.g., a ribbon cable) is commonly used to transmit signals between the preamplifier and a printed circuit substrate mounted on the base of the hard disk drive. Often, in contemporary designs, the flexible printed circuit cable is doubled back upon itself or, alternatively, is provided with excessive length, in order to accommodate a complete sweep of the actuator across the surface of the disk; in some contemporary designs the cabling is twisted to mate with the printer circuit mounted upon a base of the disk drive. Consequently, movement of the actuator concomitantly, causes extension or compaction of the flexible printed circuit cable as the one end attached to the actuator is dragged alone to follow the rotation of the actuator. I have found that due to the very low coefficient of friction and the resultant extreme sensitivity of the actuator and its bearing to rotation within the plane defined by the surface of the disk, the flexible circuit generates a bias force effecting rotation of the actuator within that plane. In conventional drives the flexible printed circuit considers the generated bias force and then adjusts a value of an electric current that is applied to position the heads borne by the actuator when the magnetic head of the actuator searches for a specific track on the disk. I consider the creation of the bias force and the need to adjust the applied current to be major problems that detract from performance capability.

SUMMARY OF THE INVENTION

It is an object of the present invention to provide an improved electrical connection between a moving actuator and a printed circuit substrate of a hard disk drive.

It is another object to provide an improved electrical connection between a printed circuit substrate and an actuator of a hard disk drive in order to minimize any influence effecting rotation of a magnetic head relative to a disk within the drive.

It is yet another object of the present invention to provide an electrical connector to connect an actuator with a printed circuit substrate, installed on a base of a hard disk drive by using a connecting wire, thereby removing a bias force having an influence on rotation of the magnetic head.

It is still another object of the present invention to provide an electrical connecting device between electrical components mounted on an actuator and a printed circuit mounted on a base of a disk drive while reducing an error factor characterizing positioning of the head mounted upon an actuator, by transmitting a signal between the flexible printed circuit and the magnetic head, when the magnetic head of an actuator searches for a specific track of the hard disk.

It is still yet another object to minimize the occurrence of external forces influencing rotation of the actuator of a hard disk drive.

It is a further object to provide a hard disk drive exhibiting an enhanced degree of accuracy in the positioning of the head relative to the surface of a rotating memory disk.

It is still a further object to provide a simplified process for manufacturing hard disk drives able to position a head with a lower rate of error at an address on a rotating memory disk.

These and other objects may be realized with a connecting device constructed according to the principles of the present invention with flexible printed circuit cabling extending through a hole formed in a center of a boss installed on the base of a hard disk drive. A pivot bearing supporting the center of the actuator is inserted around the boss, and a pivot screw having a wire hole formed on a center of the upper portion of a pivot screw is fixed to the boss, thereby enabling almost frictionless rotation of the actuator relative to the boss. Then, the flexible printed circuit cabling is connected to a printed circuit substrate installed at a bottom of the base. The flexible printed circuit cabling is connected to a preamplifier fixed at one side of the actuator by using the connecting wire passing through the hole through the pivot screw and the hole through the boss. Thus, transmission of signals between the head and the base of the disk drive is possible and the bias force generated by the flexible printed circuit cabling is eliminated.

BRIEF DESCRIPTION OF THE DRAWINGS

A more complete appreciation of the invention, and many of the attendant advantages thereof, will be readily apparent as the same becomes better understood by reference to the following detail description when considered in connection with the accompanying drawings in which like reference symbols indicate the same or similar components, wherein:

FIG. 3 is a sectional view illustrating a connection of a flexible printed circuit cabling constructed according to the principles of the present invention;

FIG. 4 is a view illustrating a configuration of one embodiment of a connecting device of a flexible printed circuit cabling constructed according to the present invention;

FIG. 5 is a sectional view illustrating a connection of the flexible printed circuit cabling of FIG. 4.

DETAILED DESCRIPTION OF THE PREFERRED EMBODIMENT

Figure 1:
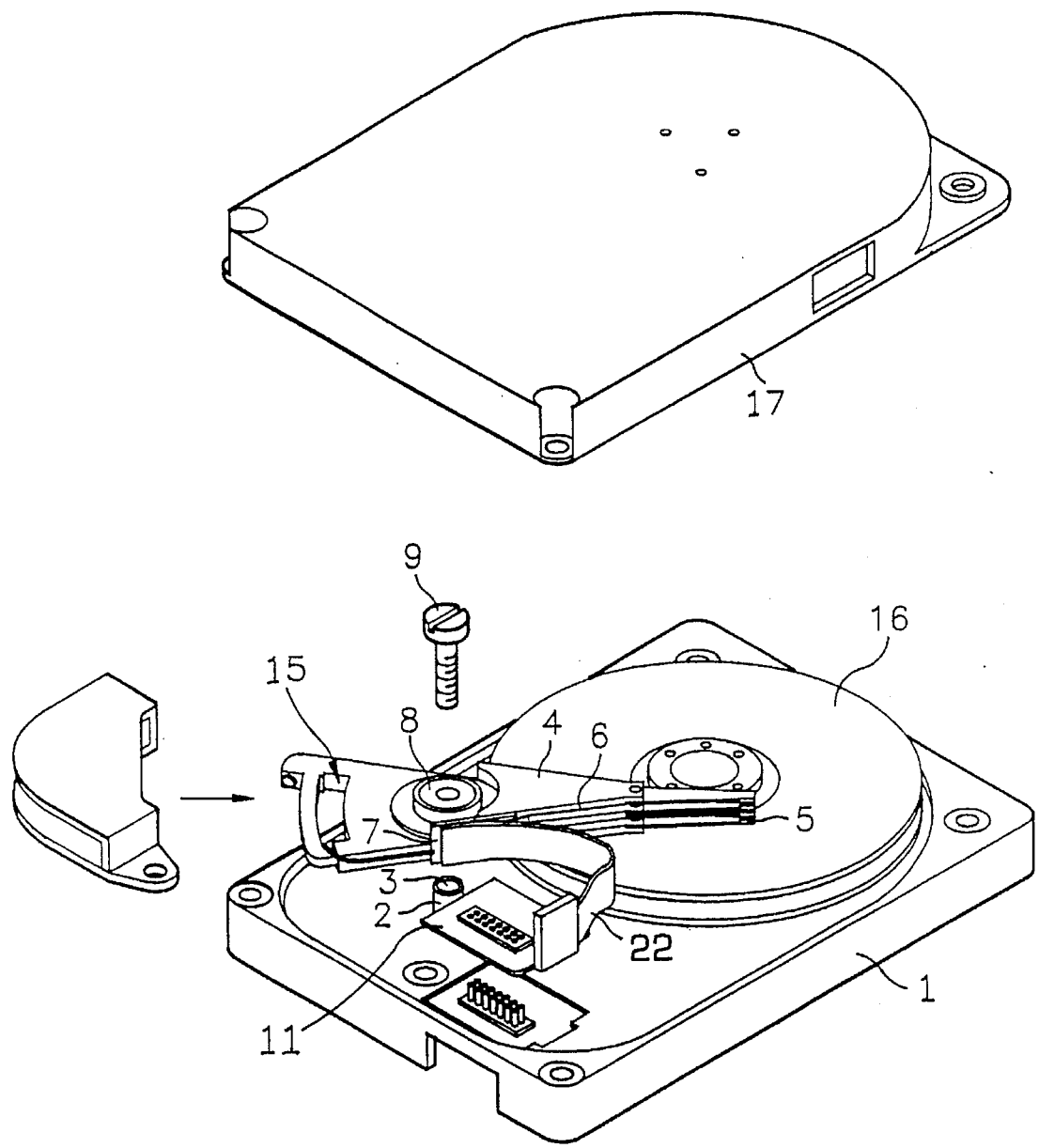
FIG. 1 is a view illustrating a representation of a configuration of a connecting device using flexible printed circuit cabling connected to an actuator embodying conventional manufacturing techniques.

Turning now to the drawings, in a conventional hard disk drive as shown in FIG. 1, a pivot bearing 8 assembled at the center of an actuator 4 is inserted around a boss 2 formed on a body of a base 1 of the hard disk drive, and a pivot screw 9 is inserted through an upper portion of actuator 4, so that the actuator 4 is rotatably centered around boss 2. In the hard disk drive, the head gimbals in which a magnetic head 5 is mounted, are placed at a leading end of actuator 4 and a voice coil motor 15 is placed at a rear end of actuator 4, thereby rotating actuator 4 with an electromotive force imparted by motor 15 to actuator 4, to position and write data onto or read data recorded on a disk 16 through magnetic head 5. In the hard disk drive, a preamplifier 7 is fixedly installed at one side of actuator 4 and a signal cable 6 is connected between magnetic head 5 and proamplifier 7. Also, an electrically conducting cable is connected between the voice coil motor 15 and preamplifier 7. Flexible printed circuit cabling 22 such as multi-conductor ribbon cable, is in widespread use as a means for transmitting electrical and signals is connected between preamplifier 7 and the printed circuit substrate 11 on base 1, and a cover 17 of the hard disk drive is attached to base 1.

Flexible printed circuit cabling 22 is simple in its appearance and structure, it is usually made by covering a circuit with a material similar to a film. I have discovered however that flexible printed circuit cabling 22 creates repercussive force that acts as a bias effecting the rotation of the actuator. In order to compensate for the biasing effects of the repercussive force on the rotation of actuator 4, the flexible printed circuit component of cabling 22 may be employed to consider the generated bias force and then adjust a value of an electric current, when the magnetic head 5 of the actuator 4 searches for a specific track. I have noticed that this is one of the major problems that detracts from performance accuracy of a hard disk drive while searching for a specific track on disk 16, and that robs the drive and its positioning circuits of their simplicity.

Figure 2:
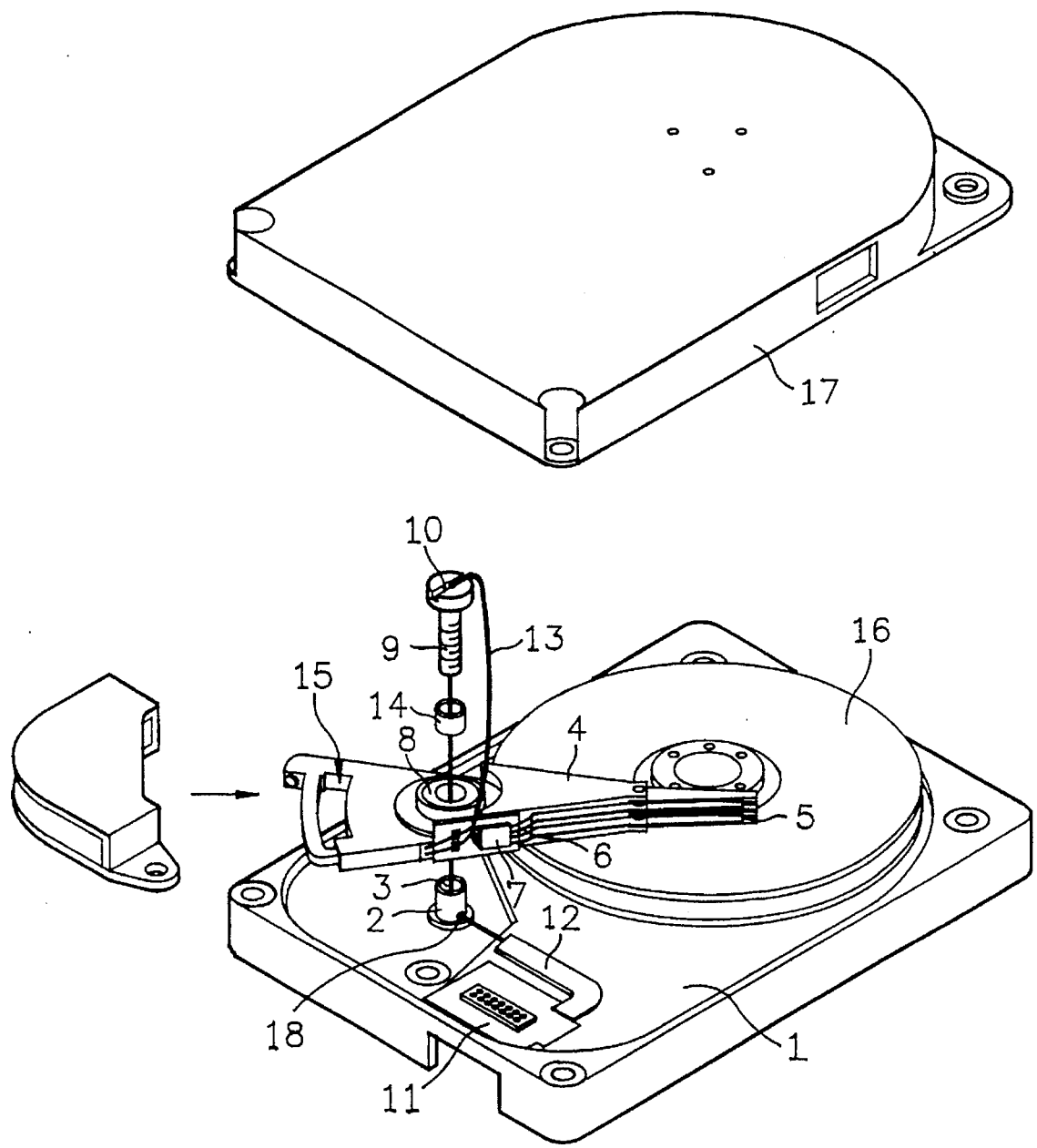
FIG. 2 is view illustrating a configuration of a connecting device of a flexible printed circuit cabling connected to an actuator constructed according to the principles of the present invention.

FIG. 2 and FIG. 3 respectively provide a view and a sectional view illustrating a configuration and an assembly constructed according to the principles of the present invention.

In the embodiment shown in FIGS. 2 and 3, a hole 3 extends through a center portion of a boss 2 formed to protrude above a body of base 1, in order to connect a preamplifier 7 to a flexible printed circuit cable 12 that is connected to a printed circuit substrate 11 on the body of base 1. Boss 2 serves as a shaft for actuator 4 with a pivot bearing 8 of actuator 4 fitted around the exterior circumferential surface of boss 2 and a fastener such as a pivot screw 9 that is provided with a wire hole 10 formed coaxially through the center of the upper portion of pivot screw 9 extending coaxially through bearing 8 to threadingly engage boss 2, thus enabling actuator 4 to rotate around boss 2. On the interior surface of base 1, flexible printed circuit cable 12 is installed and is connected to printed circuit substrate 11. A bundle of electrical leads forms a multi conductor connecting wire 13 that is connected between preamplifier 7 and flexible printed circuit cable 12 through wire hole 10 of a hollow threaded fastener such as pivot screw 9. A side hole 18 is formed at one side of a lower portion of boss 2 to accommodate passage of connecting were 13. one end of connecting wire 13 is connected to preamplifier 7 of actuator 4 and the other end of connecting wire 13 is connected to the end of printed circuit cable 12 mounted on base 1. A hub 14, which has the same outer diameter and periphery as boss 2, and which is perforated by a hole coaxially through its center portion, is installed above the upper portion of boss 2 to support the upper portion of bearing 8 of actuator 4. Then, a cover 17 of the hard disk drive is fastened at the upper portion of base 1 to fully enclose the hard disk drive mounted upon base 1.

Flexible printed circuit cable 12 may be constructed as a plurality of electrically conductive layers deposited in a spaced-apart array on an underlying flexible firm substrate or, alternatively, as multi-conductor ribbon cable, terminating for example, in a plurality of pads that may be electrically coupled as, for example, by solder, to different individual ones of the electrical leads forming multi-conductor connecting wire 13. Flexible printed circuit cable 12 may be attached to base 1 with an adhesive, while connecting wire 13 electrically couples preamplifier 7 to cable 12, The operational effect of the embodiment constructed as described in the forgoing paragraphs will be described hereinafter.

In order to facilitate rotation of actuator 4, pivot bearing 8, attached as, for example by threaded engagement between screw 9 and a hollow threaded interior of boss 2, is inserted around boss 2 of base 1. For supporting the upper side of bearing 8, the hub 14 of actuator 4 is placed at the upper portion of boss 2 to engage bearing 8. Pivot screw 9 having the wire hole 10 extending through its center portion, is assembled to be attached to boss 2, for example by a force fit into boss 2 or by threaded engagement between screw 9 and a hollow threaded interior of boss 2. Signal cable 6 of magnetic head 5 held by actuator 4, is connected to preamplifier 7 that is fixedly installed on one side of actuator 4. Flexible printed circuit cable 12 is connected to printed circuit substrate 11 on base 1 and is fixedly mounted on the interior surface of base 1, and is then connected to preamplifier 7 by connecting wire 13. Connecting wire 13 is passed through hole 3 formed in boss 2 and side hole 18 formed on one side of the lower portion of boss 2 via wire hole 10 formed through the center of pivot screw 9. One end of connecting wire 13 is connected to preamplifier 7 of actuator 4 and the other end of connecting wire 13 is connected to the end of flexible printed circuit cable 12 fixed to base 1. Thus, connecting wire 13 assists in the transmission of signals between printed circuit substrate 11 and magnetic head 5 via flexible printed circuit cable 12 without creating any bias force.

As mentioned above, for the sake of transmitting signals between magnetic head 5 of actuator 4 and printed circuit substrate 11 of base 1, connecting wire 13 passes through wire hole 10 of pivot screw 9, hole 3 of boss 2 and side hole 18, and connects the flexible printed circuit cable 12 with preamplifier 7. Thus, upon reading of the data stored on disk 16, preamplifier 7 amplifies weak signals received from magnetic head 5. Therefore, the amplified signals provided by preamplifier 7 are transmitted to flexible printed circuit cable 12 fixed to the bottom of base 1 by connnecting wire 13 and are then transmitted to the circuit of printed circuit substrate 11.

At this time, one end of connected wire 13 is connected to preamplifier 7 of actuator 4. Connecting wire 13 passes through wire hole 10 positioned at the center of pivot screw 9 (e.g., threadingly) engaging boss 2 and then passes through side hole 18. Thus, connecting wire 13 is connected to the end of flexible printed circuit cable 12 fixed on the bottom of base 1. Therefore, when magnetic head 5 reads or writes data recorded on disk 16, the torque applied to actuator 4 from wire 13 when rotated by an electromotive force of a voice coil motor 15 is weak. This torque is insubstantial when compared with the inertia of actuator 4 and, in contemporary practice, may be ignored because little or no bias force is imparted from wire 13 to actuator 4. Therefore, magnetic head 5 is not affected upon the transmission of signals. Thus when magnetic head 5 reads and writes data on disk 16, it can be performed with a high degree.

An explanation of the construction of the present invention will be given, with reference to FIG. 4 and FIG. 5 showing an embodiment constructed according to the principles of the present invention.

There is provided hole 3 passing through the center portion of boss 2 formed to protrude from the body of base 1, in order to electrically connect preamplifier 7 to flexible printed circuit cable 12 that is connected to printed circuit substrate 11 on the body of base 1. Pivot bearing 8 of actuator 4 is fitted around boss 2, thereby enabling rotation of actuator 4 around boss 2. Pivot screw 9 is perforated by wire hole 10 and, engages the inside surface of boss 2. On the bottom portion of base 1 as described above, flexible printed circuit cable 12 is flexibly installed to provide electrical connection with printed circuit substrate 11. Through the wire hole 10 of pivot screw 9 and hole 3 of boss 2, one end of connecting wire 13 is connected to preamplifier 7 of actuator 4 and the other end of the conecting wire 13 is connected to the end of flexible printed circuit cable 12 fixed to base 1. Thereinafter, cover 17 of the hard disk drive is attached to the upper portion of base 1.

Pivot screw 9 fixed in hole 3 of boss 2 has a screw thread at the lower portion thereof, and the upper portion of pivot screw 9 has the same outer diameter and periphery as boss 2. Pivot screw 9 has wire hole 10 passing through its center and the upper portion of pivot screw 9 supports the upper portion of pivot bearing 8.

The effect and the operation provided by the embodiment of the present invention constructed as described in the forgoing paragraphs will be described hereinafter.

Pivot bearing 8 of actuator 4 is inserted between actuator 4 and boss 2 of base 1, and pivot screw 9 having the wire hole 10 formed on the center thereof is assembled to engage hole 3 of boss 2. The, preamplifier 7 is fixed at one side of the actuator 4 and is connected to flexible printed circuit cable 12 mounted on the bottom surface of base 1. Through wire hole 10 of pivot screw 9 and hole 3 of boss 2, one end of connecting wire 13 is connected to the preamplifer 7 of the actuator 4 and the other end of the connecting wire 13 is connected to the end of flexible printed circuit cable 12 mounted on base 1.

Thus, transmission of signals between the printed circuit 11 and magnetic head 5 is possible, via connecting wire 13 between the flexible printed circuit 12 mounted on the bottom surface of base 1, and preamplifier 7 of actuator 4, centered about the pivot provided by screw 9. Therefore, when magnetic head 5 reads or writes data recorded on disk 16, the bias force applied to actuator 4 from wire 13 is very small. This bias force is minuscule in comparison with the inertia of the actuator 4 and no appreciable bias force exists. Therefore, magnetic head 5 is not affected upon the transmission of signals. Thus, when magnetic head 5 reads and writes data on disk 16, the head signal can be exactly read from the data and written to the media on the disk.

According to the embodiment of the present invention as described above, connecting wire connects the flexible printed circuit connected to the printed circuit substrate, to the preamplifier installed on the actuator of the hard disk drive through the wire hole of the pivot screw and the hole in the boss. Thus, when the actuator is rotated by the electromotive force, any bias force which has an influence on the magnetic head, can be avoided. Also, when the magnetic head of the actuator finds a specific track by transmitting the signal between the printed circuit and the magnetic head, the resultant error can be reduced.

Figure 6:
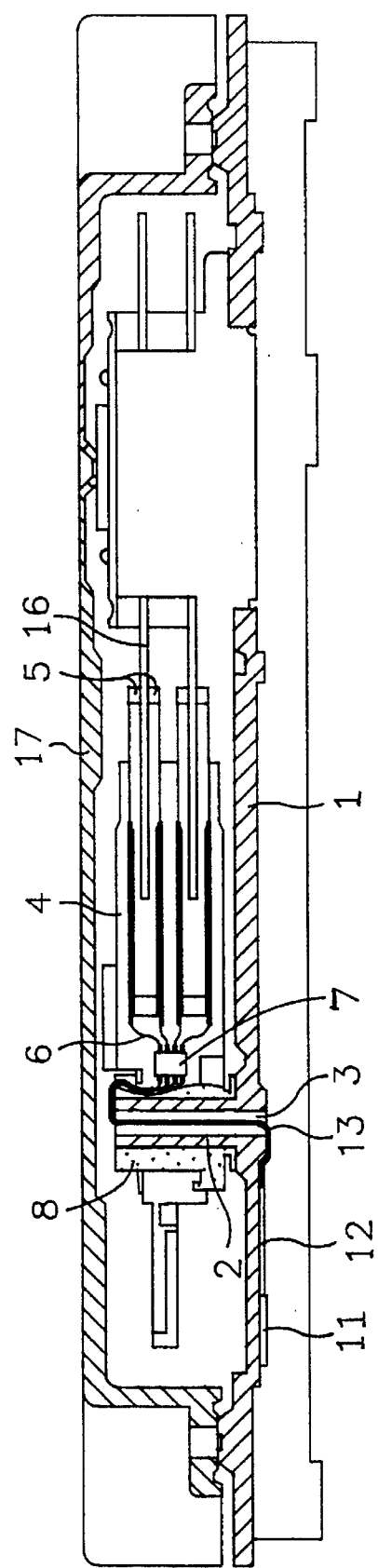
FIG. 6 is a sectional view illustrating another embodiment providing a connection for a flexible printed circuit cabling constructed according to the principles of the present invention.

The construction and the operational effects of another embodiment constructed according to the principles of the present invention, will be described hereinafter with reference to FIG. 6.

There is provided hole 3 passing through the center portion of a boss 2 formed to protrude from base 1, in order to provide electrical connection between preamplifier 7 connected to signal cable 6 of magnetic head 5 which is installed on actuator 4 of the hard disk drive, and flexible printed circuit cable 12 connected to printed circuit substrate 11 mounted on base 1. Also, pivot bearing 8 of actuator 4 is inserted around boss 2, thus enabling rotation of actuator 4 around boss 2. On the bottom surface of base 1 as described above, the flexible printed circuit cable 12 is connected to printed circuit substrate 11 which is fixedly installed, and connecting wire 13 is connected between preamplifier 7 and flexible printed circuit cable 12 through hole 3. Therein, one end of connecting wire 13 is connected with preamplifier 7 of actuator 4 and other end of connecting wire 13 is connected to the end of flexible printed circuit cable 12 that is, in turn, attached to base 1.

The operational effect according to this latter embodiment of the present invention constructed as described in the forgoing paragraph will be described hereinafter.

Pivot bearing 8 of actuator 4 is inserted around boss 2 of base 1. Connecting wire 13 is connected to preamplifier 7 of actuator 4 and printed circuit substate 11 on the bottom surface of base 1 through the hole 3 passing through the boss 2. Thus, transmission of signals between the circuits on the printed circuit substrate 11 and the magnetic head 5 of actuator 4 is possible and any bias force generated by the flexible printed circuit cable 12 is eliminated.

Therefore, when magnetic head 5 reads or writes data recorded on the disk 16, the bias force applied to actuator 4 from wire 13 is very small. This force is insignificant when compared with the inertia of the actuator 4 when actuator 4 is driven by voice coil motor 15, and no appreciable bias force exists. Therefore, magnetic head 5 is not affected upon transmission of signals. Thus, when magnetic head 5 reads and writes data on disk 16, the head signal can be reliably read from the data and written onto the media on the disk.

As described above, the flexible printed circuit cable connecting the printed circuit substrate is mounted to be connected to the preamplifier installed on the actuator in the hard disk drive via multi-conductor connecting wire. Therefore, the invention described provides advantages in that the bias force, which has an influence upon the positioning of the magnetic head when the actuator is rotated by the electromotive force, can be minimized or eliminated by connecting the preamplifier to the flexible printed circuit cable through the hole of the boss via the connecting wire, and in that the likelihood of error during positioning of the heads borne by the actuator can be reduced when the magnetic head of the actuator searches for a specific track while transmitting signals between the printed circuit and the magnetic head.

What is claimed is:

1. A connecting device for enabling transmission of electrical signals between a printed circuit substrate installed on a base and a magnetic head placed on an actuator in a hard disk drive, said device comprising:

an amplifier electrically connected to said magnetic head via a signal cable for amplifying the electrical signals received from said magnetic head;

a boss extending outwardly from said base, said boss having a center hole extending through an interior portion of said boss and a side hole formed in a lower side portion of said boss for providing passage of a connecting wire that transmits the electrical signals from said amplifier to a printed circuit cable electrically connected to said printed circuit substrate;

a pivot bearing fixed between said actuator and said boss to enable said actuator to be rotated around said boss; and a pivot screw inserted within said center hole for connecting said actuator to said boss, said pivot screw having a wire hole extending through an interior portion of said pivot screw for containing said connecting wire as said connecting wire extends from said amplifier to said printed circuit cable through said wire hole, said center hole and said side hole.

2. The connecting device of claim 1, further comprising a hub having a same outer periphery as said boss and being positioned on a top portion of said boss for engaging and supporting a top portion of said pivot bearing.

3. The connecting device of claim 1, further comprising said printed circuit cable being attached to a bottom surface of said base by an adhesive.

4. A connecting device in a hard disk drive for enabling transmission of electrical signals between a magnetic head installed on an actuator and a printed circuit substrate installed on a bottom surface of a base, said device comprising:

an amplifier electrically connected to said magnetic head for amplifying the electrical signals received from said magnetic head;

a boss extending upwardly from a top surface of said base and having a center hole extending through an interior portion of said boss;

a pivot bearing fixed between said actuator and said boss to enable said actuator to be rotated around said boss;

a connecting wire for electrically connecting said amplifier to a printed circuit cable electrically connected to said printed circuit substrate; and a fastening member inserted within said center hole for connecting said actuator to said boss, said fastening member having a channel extending through an interior portion of said fastening member for accommodating said connecting wire as said connecting wire extends from said amplifier to said printed circuit cable through said channel and said center hole.

5. The connecting device of claim 4, wherein said fastening member further comprises:

a first section having a same outer periphery as said boss and being positioned on a top portion of said boss; and a second section contiguous with said first section and having threads for insertion into said center hole.

6. The connecting device of claim 4, further comprising said printed circuit cable being fixedly attached to said bottom surface of said base by an adhesive.

7. A connecting device in a hard disk drive for enabling transmission of electrical signals between a magnetic head installed on an actuator of said hard disk drive and a printed circuit substrate installed at a bottom surface of a base of said hard disk drive, said device comprising:

an amplifier installed on said actuator and electrically connected to said magnetic head for amplifying the electrical signals received from said magnetic head;

a boss extending outwardly from a top surface of said base and having a center hole extending through an interior portion of said boss;

a pivot bearing positioned between said actuator and said boss to enable said actuator to be rotated about said boss; and a connecting wire extending from said amplifier to a printed circuit cable on said bottom surface of said base through said center hole of said boss for electrically connecting said amplifier to said printed circuit cable, said printed circuit cable being electrically connected to said printed circuit substrate.

8. The connecting device of claim 7, further comprised of said printed circuit cable being attached to said bottom surface of said base by an adhesive.

9. A hard disk drive, comprising:

an actuator arm having a first end supporting a magnetic head;

amplification means for amplifying electrical signals received from the magnetic head;

first means for electrically connecting the magnetic head to said amplification means;

second means for electrically connecting said amplification means to a printed circuit spaced-apart from said actuator arm;

a shaft extending upwardly from a base portion of said hard disk drive, said actuator arm being rotatably installed upon said shaft, said shaft having a first hollow interior portion extending from an uppermost portion of said shaft to a lowermost portion of said shaft; and a fastener having a second hollow interior portion extending from an uppermost portion of said fastener to a lowermost portion of said fastener, said fastener being installed concentrically within said shaft to secure installation of said actuator arm upon said shaft, said second hollow interior portion for accommodating placement of said second connecting means while said second connecting means electrically connects said amplification means to said printed circuit.

10. The device of claim 9, further comprised of said shaft being perforated by a hole positioned above said lowermost portion of said shaft and below said lowermost portion of said fastener, said hole providing an exit from said first hollow interior portion of said shaft for accommodating passage of said second connecting means while said second connecting means connects said amplification means to said printed circuit.

11. The device of claim 10, further comprised of said second connecting means comprising an electrically conductive wire.

12. The device of claim 11, further comprised of said electrically conductive wire extending from said hole and being electrically connected to said printed circuit installed on a top surface of said base portion of said hard disk drive.

13. The device of claim 9, further comprised of said second connecting means comprising an electrically conductive wire.

14. The device of claim 13, further comprised of said electrically conductive wire extending radially outwardly from said first hollow interior portion of said shaft at said lowermost portion and being electrically connected to said printed circuit installed on a bottom surface of said base portion of said hard disk drive.

15. A method for enabling electrical communication between magnetic head means for reading and writing data from and onto a disk and a printed circuit in a hard disk drive device, comprising the steps of:

transmitting first electrical signals to an amplifier, said first electrical signals being read from the disk by said magnetic head means positioned on a first end of an actuator arm;

amplifying, via said amplifier, the first electrical signals read from the disk by said magnetic head means; and transmitting the first electrical signals from said amplifier to said printed circuit via a conduction path extending through an interior portion of a shaft upon which said actuator arm is rotatably installed.

16. The method as claimed in claim 15, further comprising a step of transmitting second electrical signals from said printed circuit to said magnetic head means via said conduction path, said second electrical signals being written onto the disk by said magnetic head means.

* * * * *